March 16, 1926.                                                                         1,577,304
J. SCHURCH
MOTOR WHEEL FOR VEHICLES
Filed Oct. 16, 1922
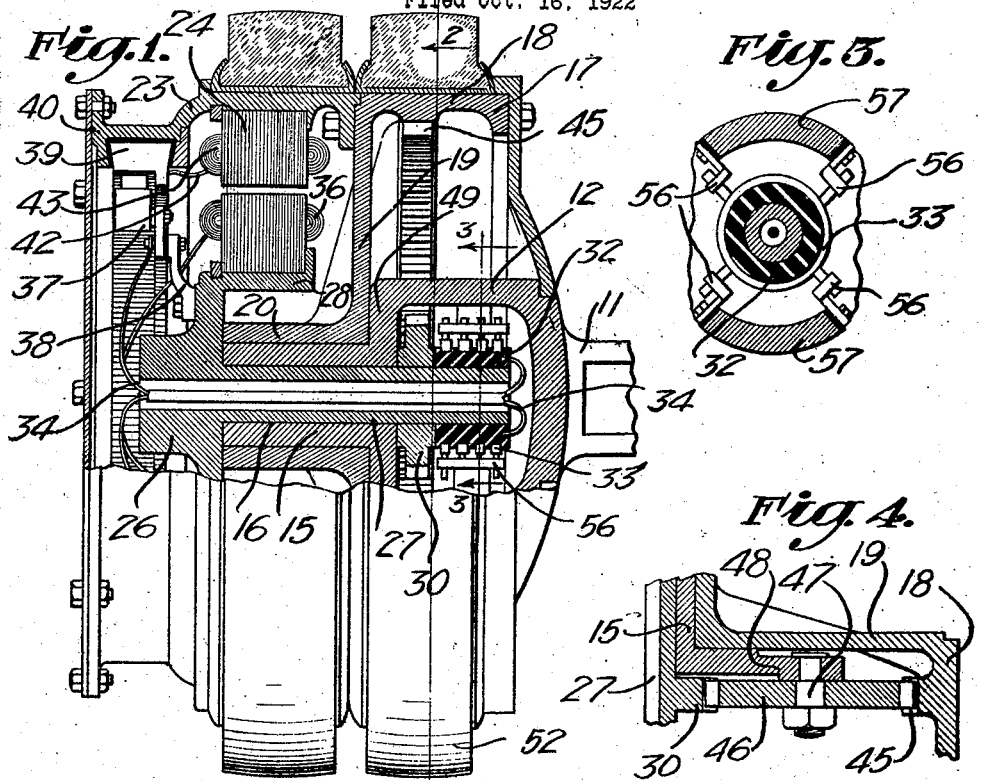
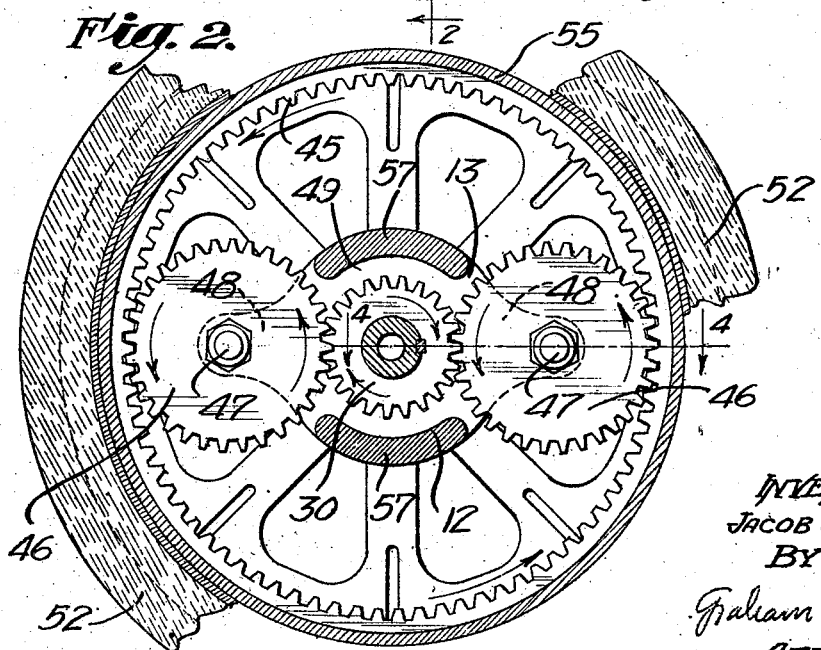
INVENTOR:
JACOB SCHURCH,
BY
Graham + Lewis
ATTORNEYS Patented Mar. 16, 1926.

1,577,304

UNITED STATES PATENT OFFICE.

JACOB SCHURCH, OF LOS ANGELES, CALIFORNIA, ASSIGNOR OF ONE-HALF TO WILLIAM H. HEISE, OF LOS ANGELES, CALIFORNIA, AND ONE-HALF TO BENJAMIN C. TUNISON, OF PITTSBURGH, PENNSYLVANIA.

MOTOR WHEEL FOR VEHICLES.

Application filed October 16, 1922. Serial No. 594,795.

*To all whom it may concern:*

Be it known that I, JACOB SCHURCH, a citizen of the United States, residing at Los Angeles, in the county of Los Angeles and State of California, have invented a new and useful Motor Wheel for Vehicles, of which the following is a specification.

My invention relates to electrically driven vehicles and more particularly to that class of electric vehicles in which the driving motor is incorporated in the wheel.

Many previous inventors have sought to provide such a wheel, using a motor having two elements, one of which rotates with relation to the other, one of these elements being rigidly fixed with relation to the vehicle and the other being rigidly attached to the wheel which is driven thereby.

Where the wheel is so constructed, the speed of the rotating element of the motor is the same as the speed of the wheel; and, since the diameter of the wheel is determined by mechanical and road conditions, the speed of the motor cannot be increased above a definite maximum, which is so low that the motor must be made unduly heavy,—it being a well known fact that the weight of an electric motor of given horsepower ordinarily varies inversely with the speed.

It is an object of my invention to provide, in an electrically driven wheel, means by which an electric motor may be incorporated in said wheel in such a manner that the effective rotative speed of the motor is several times that of the wheel so that a high speed motor of low weight may be used.

A further object of my invention is to so couple the motor to the wheel that one element of the motor is fixed to and rotates with the wheel and the other element rotates in the opposite direction at a considerably higher speed, the torque of both elements being, however, utilized to drive the wheel.

It is a further object of the invention to provide a motor wheel of this character having a large diameter commutator, so that a greater number of commutator bars can be provided having greater width than is possible with the small diameter commutators now in use.

A further object of my invention is to provide a motor wheel which will operate with equal power either in forward or reverse direction.

The specific advantages of my invention and further objects thereof will be made evident hereinafter.

Referring to the drawing which is for illustrative purposes only,

Fig. 1 is a partially sectioned elevational view of a truck wheel embodying the features of my invention.

Fig. 2 is a sectional view taken upon a plane represented by the line 2—2 of Fig. 1.

Fig. 3 is a fragmentary section taken upon a plane represented by the line 3—3 of Fig. 1.

Fig. 4 is a fragmentary plan partly in section upon a plane represented by the line 4—4 of Fig. 2.

In the construction of my device I employ a forged axle 11 having a box 12 formed upon each end thereof, one end of such an axle being shown in Fig. 1. The box 12 is open at each side, as indicated at 13 in Fig. 2, and has a cylindrical projection 15 extending forwardly therefrom provided with a concentric bore 16. A wheel member 17 having a cylindrical shell 18, a radial web 19, adapted to transmit a load and a hub 20, is rotatably mounted upon the projection 15, and has bolted upon the front thereof a cylindrical shell 23 in which an armature 24 is mounted, shells 18 and 23 being shown as of substantially equal diameter and as constituting felloes carrying tires. A member 26 having a hollow quill 27 and an inwardly turned cup 28 is turnably mounted in the bore 16 of the projection 15, and has a pinion gear 30 mounted upon the end of the quill 27 which extends through the projection 15, into the interior of the box 12. Upon an insulating member 32 collector rings 33 are mounted and conductors 34 are extended from these collector rings through the quill 27 and attached to the field coils 36 and brush holders, such as indicated at 37, mounted upon arms 38 secured to the member 26.

Within the shell 23 commutator segments 39 are mounted in a dovetail slot 40, and leads 42 are connected between the commutator segments 39 and the armature windings 43. Upon the interior of the shell 18, serving as a felloe, and directly beneath a tire thereon, is shown an internal gear 45. Idlers 46 are mounted upon pins 47 supported by webs 48 which project horizontally from the forward wall 49 of the box 12, these gears 46 being in mesh with the pinion 30 and the internal gear 45. Rubber tires 52, or other suitable treads, are mounted upon the exterior of the outer or primary member 55 which is comprised of the members 17 and 23. The member 26 will be hereinafter referred to as the secondary rotary member.

As shown in Fig. 3 the collector rings 33 are fed with electric current from brushes 56 insulatedly mounted upon the top and bottom walls 57 of the box 12, the electric current passing through the conductors 34 and the armature and field windings, as will be evident from the drawing. It will be perceived that when the armature windings 43 and the field windings 36 are energized, the magnetic action therebetween will rotate the primary member 55 and the secondary member 26 in opposite directions. The torque thus produced in the secondary member is transmitted by the pinion 30, through the idlers 46, to the internal gear 45 which is formed within the primary member. By proportioning the pitch diameters of the pinion 30 and the internal gear, any desired relative rotation between the primary and secondary members may be obtained. Let it be assumed that the pitch diameter of the pinion 30 is one-fourth of the pitch diameter of the internal gear 45. The pinion 30 would then rotate at four times the speed of the internal gear 45 owing to the interconnection therebetween of the idlers 46. Let it then be assumed that the average number of revolutions at which the primary member 45 will rotate is 250 revolutions per minute; then due to the gearing arrangement, the secondary member will rotate at a speed of 1000 R. P. M. when the primary member is rotated at 250 R. P. M.

Since the wheel is rotating at 250 R. P. M. in a positive direction and the field element is rotating at 1000 R. P. M. in a negative direction, we have an effective speed of 1250 R. P. M. for the motor with the centrifugal forces and vibration of only 1000 R. P. M.

Such a motor wheel as I have shown is particularly suitable to heavy duty motor trucks in which a direct current generator is driven by an internal combustion motor, and the direct current power transmitted to the motors in the wheel when it is desired to propel the vehicle.

In some localities trackless trolleys are used which are electrically driven and obtain their power from a trolley wire suspended over the course which the vehicle travels. My invention is also particularly suited to such use, because with the large diameter commutator I employ it is possible to utilize a current of 600 volts or higher, which is desirable in order to employ the more economical power generating equipment and in order to use higher resistance trolley wires than would be possible with the use of low voltage current, such as is necessary in motors having small diameter commutators.

I claim as my invention:

1. In a motor wheel, the combination of: a hollow bearing element; a primary member rotatable about said bearing element and comprising a plurality of shells each serving as a felloe; a secondary member rotatable about said bearing element and comprising a quill extending therein; magnetic repulsion means associated with said members for rotating said members in opposite directions when said means are energized; and gear means between said members for transmitting the torque of one of said members to the other of said members.

2. A combination as in claim 1, in which said secondary member rotates within said primary member, said gear means comprising a pinion secured to said secondary member and within a box formed in said hollow bearing element; an internal gear secured to said primary member; and idler gears between said pinion and said internal gear.

3. In a motor wheel, the combination of: a hollow bearing element; a primary member rotatable about said bearing element and comprising a plurality of shells each serving as a felloe; a secondary member rotatable about said bearing element and comprising a quill extending therein; magnetic repulsion means associated with said members for rotating said members in opposite directions when said means are energized; gear means between said members for transmitting the torque of one of said members to the other of said members, said secondary member being adapted to rotate within said primary member, said gear means comprising a pinion secured to said secondary member and within a box formed in said bearing element; an internal gear secured to said primary member; idler gears between said pinion and said internal gear, said bearing element having lateral webs supporting pins upon which said idler gears rotate, the top and bottom walls of an intermediate box in said bearing element being separated by side openings through which said idler gears extend.

4. In a motor wheel the combination of: a hollow bearing element; a primary member rotatable about said bearing element and comprising a plurality of shells each serving as a felloe; a secondary member rotatable about said bearing element and comprising a quill extending therein; magnetic repulsion means associated with said members for rotating said members in opposite directions when said means are energized; gear means between said members for transmitting the torque of one of said members to the other of said members, said secondary member being adapted to rotate within said primary member; said magnetic means consisting of armature windings mounted in said primary member and field windings mounted within said armature winding upon said secondary member; in combination with a commutator secured in said primary member and brushes secured to said secondary member, so held that said brushes rotate in contact with said commutator, said magnetic means being separated from said gear means by a radial web adapted to transmit a load.

5. In a motor wheel, the combination of: an axle having a bearing member projecting therefrom, said bearing member having both ends thereof exposed and a bore extending therethrough; a primary member rotatably secured upon said bearing member; a secondary member having a shaft extending inwardly through said bearing member; an armature mounted in said primary member; a field member mounted upon said secondary; means for energizing said armature and said field member, causing them to rotate in opposite directions; a gear mounted upon said shaft at a point inside the inner end of said bearing member; an internal gear in said primary member; and idler gears between said gear mounted upon said shaft and said internal gear.

6. A combination, as in claim 5, in which said means for energizing said armature and said field member includes a commutator mounted in said primary member and a brush member so secured to said secondary as to rotate in contact with said commutator.

7. In a motor wheel, the combination of: an axle having a bearing member projecting therefrom, said bearing member having both ends thereof exposed and a bore extending therethrough; a primary member rotatably secured upon said bearing member; a secondary member having a shaft extending inwardly through said bearing member; an armature mounted in said primary member; a field member mounted upon said secondary member; means for energizing said armature and said field member, causing them to rotate in opposite directions; a gear mounted upon said shaft at a point inside the inner end of said bearing member; an internal gear in said primary member; and idler gears between said gear mounted upon said shaft and said internal gear, said means for energizing said armature and said field member including a commutator mounted in said primary member and a brush member so secured to said secondary member as to rotate in contact with said commutator; said primary member comprising a central radial web, a cylindrical shell, and an outwardly projecting hub disposed around said bearing member, said secondary member functioning as a cylindrical cup extending inwardly over said hub for supporting said field.

8. A combination as claimed in claim 7, in which said axle has an open-sided box at the inner end of said bearing member and projections for supporting said idler gears.

In testimony whereof, I have hereunto set my hand at Philadelphia, Pennsylvania, this 4th day of Oct., 1922.

JACOB SCHURCH.